United States Patent
Cervero et al.

(10) Patent No.: US 6,827,792 B2
(45) Date of Patent: Dec. 7, 2004

(54) LIQUID WASTE ABSORBING COMPOSITIONS

(75) Inventors: Ronald N. Cervero, Branford, CT (US); Matthew W. Gower, Stratford, CT (US)

(73) Assignee: Strategic Environmental Solutions, LLC, Branford, CT (US)

( * ) Notice: Subject to any disclaimer, the term of this patent is extended or adjusted under 35 U.S.C. 154(b) by 53 days.

(21) Appl. No.: 10/098,211

(22) Filed: Mar. 15, 2002

(65) Prior Publication Data

US 2002/0139392 A1 Oct. 3, 2002

Related U.S. Application Data

(63) Continuation-in-part of application No. 09/344,618, filed on Jun. 25, 1999, now abandoned.

(51) Int. Cl.$^7$ .................................................. B08B 7/00
(52) U.S. Cl. ................... 134/6; 134/4; 134/7; 510/215; 510/365
(58) Field of Search ...................... 134/6, 7, 4; 510/278, 510/101, 215, 108, 365, 367, 379, 507, 509

(56) References Cited

U.S. PATENT DOCUMENTS

| | | | |
|---|---|---|---|
| 3,997,692 A | 12/1976 | Lamberti | 427/215 |
| 4,261,849 A | 4/1981 | Benjaminson | 252/106 |
| 4,304,675 A | 12/1981 | Corey et al. | 252/8.6 |
| 4,552,777 A | 11/1985 | Dente et al. | 427/393.1 |
| 4,566,980 A | 1/1986 | Smith | 252/8.6 |
| 4,873,000 A | 10/1989 | Weller | 252/8.6 |
| 5,137,687 A | 8/1992 | Dunson, Jr. | 422/5 |
| 5,183,655 A | 2/1993 | Stanislowski et al. | 424/76.6 |
| 5,534,167 A | 7/1996 | Billman | 510/280 |
| 5,718,729 A | 2/1998 | Harris | 8/137 |
| 5,736,494 A | 4/1998 | Colurciello et al. | 510/278 |
| 5,783,543 A | 7/1998 | Fleckenstein et al. | 510/280 |
| 5,807,587 A | 9/1998 | Cox et al. | 424/76.6 |
| 2002/0054919 A1 * | 5/2002 | Hochwalt et al. | 424/635 |

FOREIGN PATENT DOCUMENTS

JP 357162799 10/1982

* cited by examiner

*Primary Examiner*—Alexander Markoff
(74) *Attorney, Agent, or Firm*—Peter J. Manus; Edwards & Angell, LLP

(57) ABSTRACT

Powdered compositions comprising in admixture inorganic salts and silica gel, and optionally a fragrance additive, are disclosed. The novel compositions are useful in absorbing and deodorizing liquid waste and for removing such waste from irregular surfaces, such as textiles and carpeting, as well as from smooth hard surfaces. The compositions are effective in absorbing liquid biohazards, such as blood, vomit, urine, and other body fluids. For this application, a halogen-containing compound, such as sodium hypochlorite or calcium hypochlorite is preferably included in the composition. The mixtures can also be utilized for the absorption of oil-based spills and hydrocarbons and are also effective in removing moisture and malodors associated with pet urine and other moisture-related stains encountered in the home. When applied to liquid wastes, the absorbent properties of the compositions contain the spill, creating a solid cohesive matrix that allows for easy disposal. Methods for removing liquid wastes are also disclosed.

28 Claims, No Drawings

LIQUID WASTE ABSORBING COMPOSITIONS

CROSS-REFERENCE TO RELATED APPLICATION

This Application is a Continuation-In-Part of U.S. application Ser. No. 09/344,618, which was filed on Jun. 25, 1999 now abandoned.

FIELD OF THE INVENTION

The present invention relates to powdered compositions and methods for absorbing, deodorizing and removing liquid wastes, and more particularly to inorganic salt compositions that form cohesive solid matrices upon absorption of liquids, thereby facilitating removal of liquid wastes from underlying surfaces.

BACKGROUND OF THE INVENTION

A variety of chemical compositions are known for cleaning and deodorizing carpets, curtains, and other textiles, existing in both liquid and powdered forms. Such formulations are generally effective in removing stains and malodors associated with such things as pet urine and other moisture-related stains and spills. Often the compositions are powdered formulations containing components such as inorganic salts and zeolites.

For example, Corey et al. (U.S. Pat. No. 4,304,675) disclose a powdered composition and method for deodorizing rugs comprising 50–98 wt. % of an inorganic salt (i.e. sodium or calcium sulfates, bicarbonates, chlorides, and mixtures thereof), 0.5–30 wt. % of natural or synthetic zeolites which act as anti-static and Theological control agents, up to 20 wt. % of a liquid agglomerating agent, and 0.5–5 wt. % fragrance. The powder is applied to the rugs by shaking from a container and removed with a vacuum cleaner. However, the composition of Corey et al. is useful only for deodorizing carpets and imparting other attributes such as antistatic and anti-soiling effects to the surface, but the composition does not satisfactorily absorb or remove spilled liquids from the carpet.

Dunson, Jr. (U.S. Pat. No. 5,137,687) discloses an odor treatment method which works by reacting odors emitted from systems such as sewage treatment facilities with core particles containing silica and inorganic carrier salts such as sulfates, chlorides, and bicarbonates. However, the odor treatment of Dunson, Jr. merely curbs odors on an industrial scale and cannot be used for moisture absorption to contain a spill.

Colurciello et al. (U.S. Pat. No. 5,736,494) teach a flowable granular carpet cleaning composition comprising 25–40 wt. % cellulose, 0–7 wt. % zeolite or silica gel, 12–20 wt. % of an inorganic salt, 0.1–10 wt. % solvent, 0–5 wt. % acid, and minor amounts of surfactants. The inorganic salt is selected from sodium carbonate, sodium bicarbonate, and sodium sesquicarbonate. The wet formulation is applied to carpeting or other textiles, rubbed into the stained area, then permitted to dry until the composition combines with the dirt to form dry residues. The dry residues can then be removed by vacuuming or brushing.

Smith (U.S. Pat. No. 4,566,980) teaches a powdered composition for removing spills from carpeting. The powder contains inorganic salts, such as sodium sulfate and sodium bicarbonate, and an agglomerating agent. Upon saturation with water, the inorganic salt particles "wet out" but maintain their particulate structural integrity. The absorbed liquid does not cause the particles to stick together or adhere to each other or the carpet. Because the spent particles do not clump to form a cohesive mass, they are easily removed from the carpet by vacuuming.

Weller (U.S. Pat. No. 4,873,000) teaches a formulation for freshening and deodorizing carpets which incorporates inorganic salts, such as chlorides, bicarbonates, and sulfates, aluminum silicate clay, a liquid agglomerating agent, and a fragrance. After sprinkling the powdered composition onto carpeting, the spent cleaning particles are easily removed by vacuuming.

It is apparent from the prior art that powdered inorganic salt systems exist that are useful in cleaning and deodorizing textile surfaces or for removing odors from the air. However, until now, there were no known inorganic salt powders effective in absorbing and containing liquid spills on smooth, hard surfaces, as well as on fibrous, irregular materials. Nor were any of the existing compositions useful in absorbing both water-based and oil-based stains and spills. A need therefore exists for powdered compositions that are effective in absorbing and removing a variety of stains and spills from a variety of surfaces. For example, inorganic powdered compositions that can effectively remove not only household-related aqueous spills, such as pet urine, but also spilled fuel oil and liquid biohazardous waste materials would be advantageous. It would also be advantageous if such formulations were environmentally safe and nonreactive with the underlying surfaces, and if the spilled materials could be removed easily, preferably without vacuuming, and disposed of safely. The novel powdered compositions of the present invention and the inventive methods for removing liquid wastes disclosed herein satisfy the aforementioned needs.

SUMMARY OF THE INVENTION

The present invention is based on the unexpected discovery that powdered compositions containing specific inorganic salt materials in admixture with silica gel in specific limited proportions relative to each other and to other components can effectively clean, deodorize, and absorb liquid wastes from both irregular fibrous surfaces, such as carpets, and smooth hard surfaces, such as floors. Surprisingly, unlike prior art compositions containing zeolites or silica gel, when the powdered compositions come in contact with liquid wastes, the absorbent properties contain the spill, creating a cohesive solid matrix that allows for easy and safe disposal. The novel compositions are effective in removing the moisture and malodors associated with pet urine and other moisture-related stains, and in absorbing biohazards, such as blood, vomit, and urine. In addition, the mixtures of the present invention can be utilized for the absorption of fuel oils and hydrocarbons. Furthermore, the novel powdered compositions do not impart undesirable properties on the cleaned surfaces and are environmentally safe.

Another advantage of the present compositions, which makes them more desirable for use than prior art formulations, is that the present powders can buffer both acids and bases. Thus, spills that are acidic or caustic may be safely disposed following treatment with the present compositions. In addition, the present compositions can lower the flash point of most solvents.

Therefore, in one aspect, the invention is a powdered composition useful in absorbing and deodorizing liquid waste. The composition comprises in admixture:

(a) from about 5 parts by weight to about 85 parts by weight of an alkali metal sulfate;

(b) from about 1 part by weight to about 45 parts by weight silica gel;

(c) from about 1 part by weight to about 75 parts by weight of an alkali metal bicarbonate;

(d) from about 1 part by weight to about 70 parts by weight of an alkaline earth metal sulfate; and (e) from about 0 parts by weight to about 2 parts by weight fragrance additive.

A cohesive solid matrix is formed when the powdered composition contacts the liquid waste.

In another aspect, the composition comprises in admixture:

(a) from about 20 parts by weight to about 85 parts by weight of an alkali metal sulfate;

(b) from about 5 parts by weight to about 45 parts by weight silica gel;

(c) from about 1 part by weight to about 45 parts by weight of an alkali metal bicarbonate;

(d) from about 1 part by weight to about 15 parts by weight of an alkaline earth metal sulfate; and (e) from about 0 parts by weight to about 2 parts by weight fragrance additive.

A cohesive solid matrix is formed when the powdered composition comes into contact with the liquid waste.

As used herein, the term "parts by weight" indicates the weight of the corresponding ingredient in the powdered compositions based on the total weight of the powdered compositions. The term "wt. %" indicates the percentage by weight of the corresponding ingredient in the compositions based on the total active ingredient weight of the powdered compositions.

Preferably, in the novel materials disclosed herein, the alkali metal sulfate is sodium sulfate, the alkali metal bicarbonate is sodium bicarbonate, and/or the alkaline earth metal sulfate is calcium sulfate.

In another aspect, the invention is a process for removing liquid waste comprising: (a) applying a powdered composition, as set forth above, to a liquid waste residing on a surface; (b) allowing the liquid waste and powdered composition to form a cohesive solid matrix; and (c) removing the cohesive solid matrix from the surface. Illustrative liquid wastes includes fuel oils, hydrocarbons, urine, and other oil-based and water-based spills.

The compositions optionally comprise from about 0.01 parts by weight to about 5 parts by weight of an alkali or alkaline earth metal halogen compound, such as sodium hypochlorite or calcium hypochlorite. This halogen component is particularly desirable for disinfecting biohazardous liquid wastes.

In another aspect, the invention is a process for removing liquid biohazards which comprises: (a) applying the aforementioned halogen-containing powdered composition to a liquid biohazard residing on a surface; b) allowing the liquid biohazard and powdered composition to form a cohesive solid matrix; and (c) removing the cohesive solid matrix from the surface.

In a preferred embodiment, the powdered composition comprises (a) from about 70 parts by weight to about 85 parts by weight of sodium sulfate; (b) from about 5 parts by weight to about 20 parts by weight silica gel; (c) from about 1 part by weight to about 25 parts by weight of sodium bicarbonate; (d) from about 1 part by weight to about 15 parts by weight of calcium sulfate; and (e) from about 0 parts by weight to about 2 parts by weight of the fragrance additive. More preferably, the powdered composition comprises (a) about 74 parts by weight of sodium sulfate; (b) about 12 parts by weight silica gel; (c) about 11 parts by weight of sodium bicarbonate; and (d) about 3 parts by weight of calcium sulfate. Another more preferred embodiment comprises (a) about 75 parts by weight of sodium sulfate; (b) about 15 parts by weight silica gel; (c) about 5 parts by weight of sodium bicarbonate; and (d) about 5 parts by weight of calcium sulfate.

DESCRIPTION OF THE PREFERRED EMBODIMENTS

To restate, the present invention relates to novel powdered compositions useful in cleaning, deodorizing, and removing liquid wastes, such as biohazards, moisture-related stains, oil-based spills, and hydrocarbons, from a variety of surfaces, including irregular textiles and smooth hard surfaces. The present invention also relates to a process for removing the aforementioned liquid wastes from the underlying surfaces. The powdered compositions include inorganic salt constituents in admixture with silica gel. However, unlike prior art inorganic salt compositions, the present formulations unexpectedly solidify into a coherent mass or cohesive solid matrix upon absorption of liquid waste, providing an easy and safe way to remove the debris.

As used herein, "cohesive" refers to sticking or adhering together tightly and firmly as part of the same mass. "Solid" refers to being uniformly close and having a coherent texture, wherein the material does not have an internal cavity. "Matrix" refers to a frame or mold. "Mass" is a quantity or aggregate of matter.

The inorganic salts contained in the formulations of the present invention include, in part, an alkali metal sulfate, an alkali metal bicarbonate, and an alkaline earth metal sulfate. Generally, for removing both aqueous and oil-based spills, the alkali metal sulfate is included in the composition in an amount that ranges from about 5 parts by weight to about 85 parts by weight; the alkali metal bicarbonate in an amount that ranges from about 1 part by weight to about 75 parts by weight; and the alkaline earth metal sulfate in an amount that ranges from about 1 part by weight to about 70 parts by weight of the total powdered compositions. Preferably, the alkali metal sulfate ranges from about 20 parts by weight to about 85 parts by weight; the alkali metal bicarbonate from about 1 part by weight to about 25 parts by weight; and the alkaline earth metal sulfate from about 1 part by weight to about 45 parts by weight, based on the total weight of the novel powdered compositions.

Also, in the novel compositions, the alkali metal is preferably sodium and the alkaline earth metal is preferably calcium. However, the invention is not limited to the use of sodium sulfate, sodium bicarbonate, and calcium sulfate, and other alkali metal sulfates, alkali metal bicarbonates, and alkaline earth metal sulfates may be used, as would be apparent to those of skill in the art. Furthermore, the alkali metal sulfates, alkali metal bicarbonates, and alkaline earth metal sulfates useful in the present compositions are all inorganic salts, which, per se, are known in the art, and which are commercially available from a variety of sources.

Another ingredient, which must be included in the novel compositions, is silica gel, i.e. amorphous silica, which is available from a variety of commercial sources. The absorbent and dehydrating properties of the material make it an essential constituent of the present compositions. Inclusion of the silica gel is also critical for solidification to occur.

The silica gel constituent is present in the powdered formulations in an amount that ranges from about 1 part by weight to about 45 parts by weight, preferably from about 5 parts by weight to about 45 parts by weight, based on the total weight of the composition. When the amount of silica gel is above or below these specific range limits, no clumping or solidification is observed. For use in oil-based spills or stains, the preferred amount of silica gel in the composition is from about 20 parts by weight to about 35 parts by weight.

Surprisingly, other known desiccants and absorbents, such as zeolites, which are hydrated silicates of aluminum and either calcium or sodium or both, cannot be substituted for silica gel in the present compositions. Unexpectedly also, other forms of silica, such as silica powder cannot be used instead of silica gel. When such a substitution is made, the resulting mixture does not perform as a solidifying agent (sodification rating of "0", as defined below), and only limited absorption is observed. This is very surprising because Coluriciello et al. (U.S. Pat. No. 5,738,494) cited above teaches that zeolites, both natural and synthetic, are interchangeable with silica gel for use as absorbents in carpet cleaning.

Commercially available, industrial grade materials may be used for each of the above-listed components included in the present powdered formulations. In addition, to ensure that the final compositions, after blending, are uniform and homogeneous, similar mesh sizes are generally used for each of the constituents. Dissimilar mesh sizes are generally undesirable, because they often result in separation of the ingredients. However, it is usually preferable, although not essential, to utilize crystalline metal bicarbonate, which has a larger mesh size than conventional powdered bicarbonate. The crystalline bicarbonate aids in the formation of a homogeneous mixture when blended with the other components. A suitable crystalline sodium bicarbonate formulation is commercially available from Natrium Products as sodium bicarbonate 5L.

The presence of all three inorganic salts in the specific limited ranges set forth above contributes to the overall effectiveness of the compositions in solidifying, cleaning, and absorbing the liquid wastes. As used herein, for a composition to be considered "effective" in removing liquid wastes, absorption of the liquid by the powdered composition must result in at least a moderate clumping having a rating of "2" based on a scale of 0–5, wherein "0" indicates no clumping or solidification; a rating of "1" represents slight clumping; "2" represents moderate clumping; "3" indicates slight solidification; "4" represents moderate solidification, and "5" indicates complete solidification.

For example, when all three inorganic salt ingredients were mixed with silica gel within the range amounts listed above, excellent absorption was observed, which resulted in complete solidification of the composition (5). Removal of the alkaline earth metal sulfate (calcium sulfate) resulted in moderate solidification (4). However, the use of only sodium sulfate (along with silica gel) absent sodium bicarbonate and calcium sulfate resulted in good absorption, but only moderate clumping (2). When individual components were tested, a solidification rating of only "0" or "1" was obtained, which does not facilitate the easy removal of the spill/composition from the underlying surface. Thus, performance (solidification) is optimal when all three inorganic salts are included with silica gel in the composition. Because water, containing nothing else, is the most difficult medium to solidify, water was used to test the effectiveness of the present compositions. The following example is illustrative.

EXAMPLE 1

The ingredients were mixed together in the amounts listed below for each trial, and each formulation was added separately to a water sample residing on a flat, hard surface at a concentration of about 1 gram per 1 mL of the aqueous spill. In this experiment, a preferred ratio of the active materials was included in the composition tested in Trial 1. In each consecutive trial, one more active ingredient was removed from the original composition. The elapsed time for each trial was two minutes.

| Trial 1: | Sodium Sulfate 74 wt. % | Result: 5 |
| | Silica Gel 12 wt. % | |
| | Sodium Bicarbonate 11 wt. % | |
| | Calcium Sulfate 3 wt. % | |
| Trial 2: | Sodium Sulfate 75 wt. % | Result: 4 |
| | Silica Gel 13 wt. % | |
| | Sodium Bicarbonate 12 wt. % | |
| Trial 3: | Sodium Sulfate 81 wt. % | Result: 2 |
| | Silica Gel 19 wt. % | |

Further trials were performed on each of the individual components separately. Each trial resulted in an ineffective solidification rating of 0 or 1.

Example 1 demonstrates that all the constituents of the novel composition combined within the specific optimal ranges are essential for maximum absorbency and solidification and for excellent cleaning. The elimination of even one of the active ingredients greatly reduces the beneficial effectiveness of the powdered compositions. A preferred embodiment for removing aqueous-based spills/stains is therefore the composition of Trial 1.

The following example demonstrates the effectiveness of the individual components in solidification.

EXAMPLE 2

Five mixtures of the active ingredients were prepared, wherein the amounts of sodium sulfate and silica gel constituents included in the mixtures were varied. The two minor components, sodium bicarbonate and calcium sulfate, were added in the same weight percentages in each composition. Each final formulation was applied to water spilled on a flat, hard surface at a concentration of about 1 gram per 1 mL of water. The compositions were then rated in accordance with the solidification characteristics (0–5) expressed above.

| Trial 4: | Sodium Sulfate 45 wt. % | Result: 2 |
| | Silica Gel 45 wt. % | |
| | Sodium Bicarbonate 5 wt. % | |
| | Calcium Sulfate 5 wt. % | |
| Trial 5: | Sodium Sulfate 60 wt. % | Result: 3 |
| | Silica Gel 30 wt. % | |
| | Sodium Bicarbonate 5 wt. % | |
| | Calcium Sulfate 5 wt. % | |
| Trial 6: | Sodium Sulfate 70 wt. % | Result: 4 |
| | Silica Gel 20 wt. % | |
| | Sodium Bicarbonate 5 wt. % | |
| | Calcium Sulfate 5 wt. % | |
| Trial 7: | Sodium Sulfate 75 wt. % | Result: 5 |
| | Silica Gel 15 wt. % | |
| | Sodium Bicarbonate 5 wt. % | |
| | Calcium Sulfate 5 wt. % | |
| Trial 8: | Sodium Sulfate 85 wt. % | Result: 4 |
| | Silica Gel 5 wt. % | |
| | Sodium Bicarbonate 5 wt. % | |
| | Calcium Sulfate 5 wt. % | |

Example 2 shows that when the weight percentages of sodium sulfate and silica gel are modified relative to one another, the efficiency of the composition in performing as a solidifying agent is affected. Trial 7, wherein the composition contained about 75 wt. % (or parts by weight) sodium sulfate and about 15 wt. % (or parts by weight) silica gel, provided the highest degree of solidification (rating 5), a result which is consistent with the experiment set forth in Example 1. The composition used in Trial 7 is therefore a particularly preferred embodiment of the present powdered composition for use in absorbing aqueous-based spills. In addition, because a moderate, yet effective, degree of solidification (rating 4) was observed in Trials 6 and 8, another preferred composition encompassing these embodiments comprises (a) from about 70 parts by weight to about 85 parts by weight of sodium sulfate; (b) from about 5 parts by weight to about 20 parts by weight silica gel; (c) from about 1 part by weight to about 25 parts by weight of sodium bicarbonate; and (d) from about 1 part by weight to about 15 parts by weight of calcium sulfate.

The compositions optionally include a fragrance additive, which may be selected from a variety of synthetic and natural odorants, including essential oils, aromatic chemicals, and the like. Thus, the present invention contemplates the inclusion of various fragrances or perfumes, such as essential oils having a floral bouquet, wintergreen scent, herbal, spice, citrus fragrance, etc. The fragrances may be added conventionally, for example, by admixing to the composition or by blending with the other constituents when forming the composition, in an amount useful for enhancing or imparting the desired scent characteristic to the formulation. Generally, the amount of fragrance added is an effective amount up to about 2 parts by weight, based upon the total weight of the composition, the upper limit being primarily determined by the strength and nature of the fragrance used.

In preparing the blends of the aforementioned ingredients to form the final homogeneous powdered compositions of the present invention, various conventional methods may be used. For example, all the dry powdered ingredients may be placed into a conventional rotary blender while it is operating or mixed by hand for approximately 1–5 minutes. Next, the fragrance, which is typically an oil, may be added, and the material mixed until uniformly blended. To avoid clumping of the fragrance oil, the fragrance is preferably added to a small amount of the powdered mixture, then mixed into a larger portion of the composition. Alternatively, all the ingredients, including the fragrance, could be blended together at the same time.

It should be noted, however, that the optional fragrance additive plays no role in the solidifying feature of the present composition. It is merely added to improve the smell or scent of the cohesive solid matrix after the powdered composition has come in contact with liquid waste, which often exhibits an offensive malodor.

The mesh size of the powdered compositions may be determined by a variety of known methods including passing the composition through a standardized sieve. As used herein, the term "mesh" refers to the number of apertures per square inch of a screen or sieve. The preferred mesh size of the compositions depends on the nature and type of stain/spill and on the type of underlying surface. For example, for oil-based and hydrocarbon spills, and for spills on irregular surfaces, approximate mesh sizes preferably range from about 10 to about 60 mesh. However, for aqueous spills on smooth or hard surfaces, the approximate mesh size is preferably from about 100 to about 200 mesh.

The mixture is extremely effective in removing moisture and malodors associated with pet urine, for example, and other moisture-related stains typically found in the home. The powdered composition can be utilized on carpets, rugs, and textiles without leaving undesirable properties, such as pungent odors, further staining, spotting, or discoloration, on the cleaned surface. When applied to a carpeted area associated with a moisture-related spill, the moisture from both the carpet and its underlying surface is absorbed into a cohesive solid matrix, which can then be removed. When applied to a spill on a hard, smooth surface such as a floor or counter, the solid mass which is formed can be removed by sweeping, wiping, or lifting.

The powdered compositions of the present invention are also advantageous because they can be used not only on water-based stains/spills, but also for the absorption of oil-based spills, such as fuel oils, wherein the preferred range amounts of the constituents are as previously listed. When applied to an oil or fuel spill, the absorbent properties of the composition contain the spill, creating a solid matrix that allows for easy disposal. In addition, the mixture absorbs hydrocarbons, such as organic solvents, paints, dyes, etc., and other organic materials derived from such sources as petroleum, coal tar, and plants.

The novel powdered compositions are also effective in absorbing biohazardous liquids, such as, but not limited to, blood, vomit, urine, and other body fluids. When the mixture comes in contact with any of these agents, the powdered composition forms a cohesive solid for easy and safe disposal. For use in containing liquid biohazards, the composition also preferably includes a halogen-containing compound, which acts as a disinfectant to sterilize the waste. However, because protein-containing biohazardous materials (blood, plasma, feces, tissue, etc.) absorb and deactivate some chemical disinfectants, it is important to add sufficient quantities of the disinfectants to provide the excess needed to react with and kill the microorganisms contained in the biohazard. Generally, the addition of a halogen-containing compound in an amount that ranges from about 0.01 parts by weight to about 5 parts by weight is sufficient for effective disinfection. Preferably, the halogen-containing compound is an alkali or alkaline earth metal halogen (more preferably chlorine) compound, and most preferably is selected from the group of sodium hypochlorite and calcium hypochlorite.

It is important to note that the halogen-containing compound, e.g., hypochlorite, is an "optional" ingredient of the present compositions, and it is generally added when there is a need to kill biohazards, such as pathogens. However, the halogen-containing compound does contribute to the solidifying aspect of the present composition.

It is also important to note that halogen-containing compounds are rendered ineffective as disinfectants in either acidic or basic conditions. As shown in the following example, the combination of the preferred components of the present compositions results in a mixture which has an overall neutral pH value. Thus, halogen-containing disinfectants are useful in the present compositions. The example compares the pH values of the individual ingredients with the pH value of the complete mixture.

As used herein, "biohazard" retains its conventional meaning and is a well-known term clearly understood by those of ordinary skill in the art. For example, *Webster's Medical Desk Dictionary* 75 (1986) defines biohazard as "a biological agent or condition (as an infectious organism or insecure laboratory procedure) that constitutes a hazard to man or his environment; also, a hazard posed by such an agent or condition." Similarly, *The Academic Press Dictionary of Science and Technology* 260 (1992) defines biohazard as "any risk or harm that results from exposure to infectious bacteria, viruses, or other harmful agents or their products, particularly those found in a clinical microbiology laboratory or used in genetic recombination studies."

EXAMPLE 3

Two point five (2.5) grams of each of the following ingredients were added to separate beakers, each containing 50 mL deionized water. The pH of each solution was measured using a conventional pH meter. The measured pH values were:

| Component | pH |
|---|---|
| Sodium Sulfate | 6.0 |
| Silica Gel | 5.9 |
| Calcium Sulfate | 8.0 |
| Sodium Bicarbonate | 8.0 |

A mixture was then formed from the individual components listed above, wherein each ingredient was added in an amount that fell within the corresponding required range previously provided herein. Eighty seven (87) grams of the powdered composition were added to 500 mL deionized water, and the pH of the solution was measured. A pH value of 7.0 was observed.

The results of Example 3 indicate that because the pH of the present powdered composition is neutral, a halogen-containing disinfectant added to the composition will be able to penetrate the cell walls of pathogens within a protein-containing biohazardous waste material, thereby sterilizing the debris.

The present invention also includes processes for removing liquid waste from underlying surfaces using the novel powdered compositions of the present invention. As mentioned above, liquid waste can be removed from both irregular textiles and smooth hard surfaces using the present compositions. First, a powdered composition, as described herein, is applied to a liquid waste residing on a surface. Typically, the composition can be applied from a shakeable canister or container having a siftable top that contains openings for dispensing the product. The hole size and the number of holes may vary, and the top may have a closure for regulating the number of holes being opened at any time. Thus, the amount of product dispensed can be controlled by the user. Alternatively, the product could be contained in a canister having a removable lid, scooped from the container, and then applied to the stain or spill using the scoop.

Containers made from plastics or cardboard are suitable for packaging the powdered compositions of the present invention. A cylindrical shape is particularly desirable for a shakable container, because it can be easily held in the user's hand while dispensing the contents. To prevent permeation of the container by moisture from the air, it is often advisable to include a barrier inside and outside of the container, such as a wax-coating, lamination, or aluminum foil. Glass containers are also suitable for storing the powdered compositions.

The amount of composition applied depends upon the particular nature of the spill/stain, the particular formulation, and the type of underlying surface. For carpeting, powdered compositions applied at a concentration as low as about 1 g per mL of aqueous liquid waste is generally sufficient to form a solid. However, for maximum effectiveness, it is preferable to use amounts of the composition in excess of this amount.

After applying the powdered composition to the liquid waste, which includes but is not limited to the wastes described above, the liquid waste and powdered composition are then permitted to form a solid cohesive matrix. A variety of factors determine the amount of time necessary for the materials to solidify. As would be recognized by one of skill, such factors include the amount of powdered composition applied, the size and nature of the spill or stain, the humidity and temperature, and the underlying surface, to name a few. However, when at least about 1 g of the composition is applied for every 1 mL of an aqueous or oil-based spill, absorption and solidification generally take from about 1 to 5 minutes.

After a cohesive solid matrix has been formed, the material can then be removed from the underlying surface, typically by lifting, picking up, sweeping, wiping, or otherwise clearing the solid debris from the surface. When applied to a carpeted area, it may be desirable to vacuum the area after the solid has been removed to clean up any powder residue that may adhere to the fiber.

As noted above, when the waste is a liquid biohazard, and when a halogen-containing disinfectant is included in the composition, the disinfectant contained therein will sterilize the solidified waste. However, because OSHA considers such spills to be hazardous until they can be analyzed, the solid waste material formed upon treating with the present compositions should be packaged in a disposable biohazard bag. The solidified biohazard could then be disposed of safely within the biohazard bag. For this use, potential markets for the novel powdered compositions include hospitals and other health-care organizations, the military, and ambulances, to name a few. In addition, the product could be added to first aid kits.

To take advantage of the oil, fuel, and hydrocarbon absorbing properties, the present compositions could be used by environmental engineering companies, as well as by factories. Finally, the compositions and methods would be of great benefit for use in the home due to their effectiveness in removing moisture-related stains and pet urine along with associated malodors.

While the invention has been particularly shown and described with reference to preferred embodiment(s) thereof, it will be understood by those skilled in the art that various changes in form and details may be made therein without departing from the spirit and scope of the invention.

We claim:

1. A powdered composition useful in absorbing and deodorizing aqueous or hydrocarbon-based liquid, said composition comprising in admixture:
   (a) from about 5 parts by weight to about 85 parts by weight of an alkali metal sulfate;
   (b) from about 1 part by weight to about 45 parts by weight silica gel;
   (c) from about 1 part by weight to about 75 parts by weight of an alkali metal bicarbonate;
   (d) from about 1 part by weight to about 70 parts by weight of an alkaline earth metal sulfate; and
   (e) from about 0 parts by weight to about 2 parts by weight fragrance additive;
wherein a cohesive solid matrix is created when said powdered composition contacts said liquid.

2. The powdered composition of claim 1 further comprising from about 0.01 parts by weight to about 5 parts by weight of an alkali or alkaline earth metal halogen compound.

3. The powdered composition of claim 2, wherein said halogen compound is selected from the group of sodium hypochlorite and calcium hypochlorite.

4. The powdered composition of claim 1 comprising:
(a) from about 20 parts by weight to about 85 parts by weight of an alkali metal sulfate;
(b) from about 5 parts by weight to about 45 parts by weight silica gel;
(c) from about 1 part by weight to about 45 parts by weight of an alkali metal bicarbonate;
(d) from about 1 part by weight to about 15 parts by weight of an alkaline earth metal sulfate; and
(e) from about 0 parts by weight to about 2 parts by weight fragrance additive.

5. The powdered composition of claim 4 further comprising from about 0.01 parts by weight to about 5 parts by weight of an alkali or alkaline earth metal halogen compound.

6. The powdered composition of claim 5, wherein said halogen compound is selected from the group of sodium hypochlorite and calcium hypochlorite.

7. The powdered composition of claim 1, wherein said alkali metal sulfate is sodium sulfate.

8. The powdered composition of claim 1, wherein said alkali metal bicarbonate is sodium bicarbonate.

9. The powdered composition of claim 1, wherein said alkaline earth metal sulfate is calcium sulfate.

10. The powdered composition of claim 1, wherein said alkali metal sulfate is sodium sulfate, said alkali metal bicarbonate is sodium bicarbonate, and said alkaline earth metal sulfate is calcium sulfate.

11. The powdered composition of claim 10, further comprising from about 0.01 parts by weight to about 5 parts by weight of sodium hypochlorite or calcium hypochlorite.

12. The powdered composition of claim 10 comprising:
(a) from about 70 parts by weight to about 85 parts by weight of said sodium sulfate;
(b) from about 5 parts by weight to about 20 parts by weight of said silica gel;
(c) from about 1 part by weight to about 25 parts by weight of said sodium bicarbonate;
(d) from about 1 part by weight to about 15 parts by weight of said calcium sulfate; and
(e) from about 0 parts by weight to about 2 parts by weight of said fragrance additive.

13. The powdered composition of claim 12, further comprising from about 0.01 parts by weight to about 5 parts by weight of sodium hypochlorite or calcium hypochlorite.

14. The powdered composition of claim 12 comprising:
(a) about 74 parts by weight of said sodium sulfate;
(b) about 12 parts by weight of said silica gel;
(c) about 11 parts by weight of said sodium bicarbonate; and
(d) about 3 parts by weight of said calcium sulfate.

15. The powdered composition of claim 12 comprising:
(a) about 75 parts by weight of said sodium sulfate;
(b) about 15 parts by weight of said silica gel;
(c) about 5 parts by weight of said sodium bicarbonate; and
(d) about 5 parts by weight of said calcium sulfate.

16. The powered composition of claim 1 wherein said alkali metal sulfate, alkali metal bicarbonate, alkali earth metal sulfate and silica gel, when used on said liquid waste, buffers both acids and salts.

17. The powered composition of claim 16 further comprising from about 0.1 parts by weight to about 5 parts by weight of an alkali or alkaline metal halogen compound.

18. The powdered composition of claim 1 wherein the liquid waste is a solvent and the composition lowers the flash point of the liquid waste.

19. A process for removing aqueous or hydrocarbon-based liquid comprising:
(a) applying said powdered composition of claim 1 to the liquid residing on a surface;
(b) allowing said liquid and powdered composition to form a cohesive solid matrix; and
(c) removing said cohesive solid matrix from said surface.

20. The process according to claim 19, wherein said liquid is selected from the group of fuel oils, hydrocarbons, urine, and other oil-based and water-based liquids.

21. A process for removing liquid comprising:
(a) applying said powdered composition of claim 10 to a liquid residing on a surface;
(b) allowing said liquid and powdered composition to form a cohesive solid matrix; and
(c) removing said cohesive solid matrix from said surface.

22. The process according to claim 21 herein said liquid is selected from the group of fuel oils, hydrocarbons, urine, and other oil-based and water-based liquid.

23. A process for removing liquid biohazards comprising:
(a) applying said powdered composition of claim 2 to a liquid biohazard residing on a surface;
(b) allowing said liquid biohazard and said powdered composition to form a cohesive solid matrix; and
(c) removing said cohesive solid matrix from said surface.

24. A process for removing liquid biohazards comprising:
(a) applying said powdered composition of claim 11 to a liquid biohazard residing on a surface;
(b) allowing said liquid biohazard and said powdered composition to form a cohesive solid matrix; and
(c) removing said cohesive solid matrix from said surface.

25. The process of claim 19 wherein said applying of said powdered composition buffers both acids and bases.

26. The process of claim 21 wherein said applying of said powdered compositions buffers both acids and bases.

27. The process of claim 21 wherein said applying of said powdered compositions buffers both acid and bases.

28. The process of claim 21 wherein said applying of said powdered compositions buffers both acids and bases.

* * * * *